US008407379B2

(12) United States Patent
Bulgin et al.

(10) Patent No.: US 8,407,379 B2
(45) Date of Patent: Mar. 26, 2013

(54) EFFICIENT LOW-LATENCY BUFFER

(75) Inventors: Scott Edward Bulgin, Waterloo (CA); Cyril Martin, Bochum (DE); Bengt Stefan Gustavsson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/285,660

(22) Filed: Oct. 31, 2011

(65) Prior Publication Data
US 2012/0047297 A1    Feb. 23, 2012

Related U.S. Application Data

(63) Continuation of application No. 12/581,294, filed on Oct. 19, 2009, now Pat. No. 8,073,995.

(51) Int. Cl.
*G06F 3/00*    (2006.01)
(52) U.S. Cl. ........ 710/56; 710/29; 710/33; 710/34; 710/52; 710/53; 710/57; 375/355; 375/358; 375/362; 700/94; 709/232; 709/233; 709/234
(58) Field of Classification Search .................. None
See application file for complete search history.

(56) References Cited

U.S. PATENT DOCUMENTS

| | | | | |
|---|---|---|---|---|
| 5,065,346 A | * | 11/1991 | Kawai et al. ........... 345/428 |
| 5,323,272 A | * | 6/1994 | Klingler ................. 360/8 |
| 5,367,301 A | * | 11/1994 | Stiltner et al. ......... 341/144 |
| 5,418,913 A | | 5/1995 | Fujimoto ............... 395/200 |
| 5,485,448 A | * | 1/1996 | Kishi et al. ........... 369/53.3 |
| 5,553,220 A | * | 9/1996 | Keene ................... 345/520 |
| 5,784,361 A | | 7/1998 | Bielsker ................ 370/286 |
| 5,930,451 A | * | 7/1999 | Ejiri ..................... 386/337 |
| 6,356,639 B1 | | 3/2002 | Ishito et al. ............ 381/17 |
| 6,553,424 B1 | | 4/2003 | Kranz et al. ............ 709/234 |
| 6,697,902 B1 | * | 2/2004 | Sugimoto .............. 710/305 |
| 6,715,007 B1 | * | 3/2004 | Williams et al. ........ 710/52 |
| 6,965,804 B1 | * | 11/2005 | Mercs et al. ........... 700/94 |
| 6,988,013 B1 | | 1/2006 | Fujishita ................ 700/94 |
| 7,107,111 B2 | | 9/2006 | Van De Kerkhof et al. .... 700/94 |

(Continued)

FOREIGN PATENT DOCUMENTS
EP    0615241 A2    9/1994
EP    615241 A2 *  9/1994
(Continued)

OTHER PUBLICATIONS

"Circular Buffer" article from Wikipedia, posted on Apr. 4, 2009.*

(Continued)

*Primary Examiner* — Steven Snyder
(74) *Attorney, Agent, or Firm* — Novak Druce Connolly Bove + Quigg LLP

(57) ABSTRACT

An efficient low latency buffer, and method of operation, is described. The efficient low latency buffer may be used as a bi-directional memory buffer in an audio playback device to buffer both output and input data. An application processor coupled to the bi-directional memory buffer is responsive to an indication to write data to the bi-directional memory buffer reads a defined size of input data from the bi-directional memory buffer. The input data read from the bi-directional memory buffer is replaced with output data of the defined size. In response to a mode-change signal, the defined size of data is changed that is read and written from and to the bi-directional memory buffer. The buffer may allow the application processor to enter a low-powered sleep mode more frequently.

17 Claims, 6 Drawing Sheets

U.S. PATENT DOCUMENTS

| | | | |
|---|---|---|---|
| 7,554,612 B2* | 6/2009 | Chidambaram et al. | 348/714 |
| 7,684,884 B2 | 3/2010 | Honda et al. | 700/94 |
| 2004/0156622 A1* | 8/2004 | Kent et al. | 386/96 |
| 2004/0237024 A1* | 11/2004 | Limberg | 714/784 |
| 2005/0185923 A1* | 8/2005 | Tsurui et al. | 386/68 |
| 2008/0052408 A1* | 2/2008 | Saito et al. | 709/239 |
| 2008/0071958 A1* | 3/2008 | Honda et al. | 710/262 |
| 2009/0276812 A1* | 11/2009 | Greene et al. | 725/74 |
| 2009/0276813 A1* | 11/2009 | Bleiweiss et al. | 725/82 |

FOREIGN PATENT DOCUMENTS

| | | | |
|---|---|---|---|
| GB | 2352371 A | | 1/2001 |
| JP | 405217288 A | | 8/1993 |
| JP | 410149632 A | | 6/1998 |
| JP | 410340549 A | | 12/1998 |
| JP | 02007215092 A | | 8/2007 |
| JP | 02000123483 A | | 4/2010 |
| WO | 2007009212 A1 | | 1/2007 |

OTHER PUBLICATIONS

Ens Fiedler, Christian Riede; Magedanz, Thomas—Converged Media and Communication Services: SDP for SOA-based Rich Media Service Mashups—ITREVOLUTIONS2008.5132.

Extended European Search Report Mailed Mar. 29, 2010. In corresponding application No. 09173456.6.

Examination Report mailed Feb. 22, 2012; in corresponding application No. 09173456.6.

* cited by examiner ical field

The technology described herein relates to application processors and buffers, in particular to audio buffers, for audio playback devices and methods of operating audio buffers of audio playback devices.

BACKGROUND

Audio playback devices, including portable MPEG Layer 3 (MP3) players, smart phones and other portable devices capable of audio playback, are commonly used as entertainment devices for listening to music or other audio or audio/visual data. Audio output device, such as speakers or headphones, are connected to the audio playback device and receive an analog audio signal from the audio playback device. The audio playback device generally includes controls for controlling the playback of the audio, which may include play/pause/stop, skip forward, skip backward, volume up and volume down. It will be apparent that other controls may also be included, or various controls of those listed omitted from particular audio playback devices.

With the increasing miniaturization of audio playback devices, there has become less room for the location of controls on the device itself. One option for locating the controls of the audio playback device is to include them on a remote that is separate from the audio playback device. This can include attaching a remote control unit having playback controls to the headphones or other audio output device connected to the audio playback device. The remote may communicate with the audio playback device over specialized pins or connections; however, this requires an additional physical connector, which may be undesirable or difficult to locate within an audio playback device. Wireless communication between the remote and the audio playback device is also possible; however, this results in greater power consumption for the audio playback device and requires a battery for the remote.

BRIEF DESCRIPTION OF THE DRAWINGS

Various implementations of the novel technology are described below by way of example with reference to the appended drawings in which.

DETAILED DESCRIPTION

Figure 1:
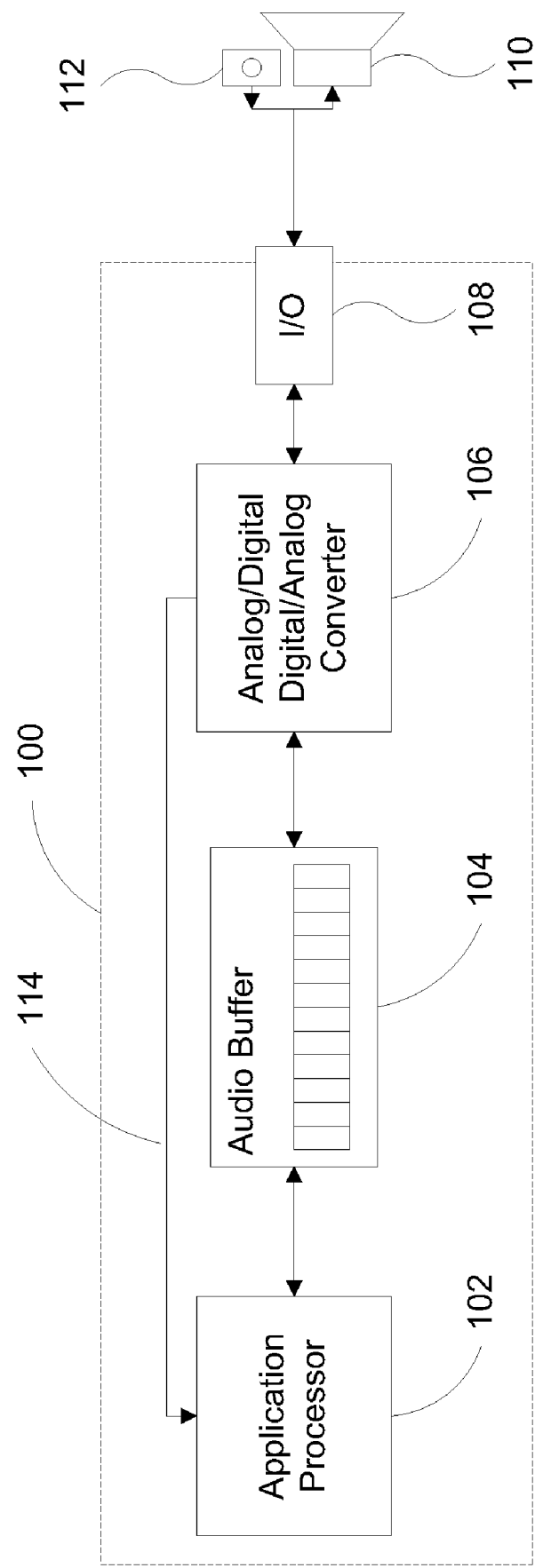
FIG. 1 depicts in a block diagram, an illustrative audio playback device, including an audio buffer.

An aspect of the present disclosure is an efficient low latency buffer comprising a first data path connection and control path connection to a discontinuous interface, a second data path connection to a continuous interface, a memory buffer for storing data and a control unit having a first mode and second mode of operation, each mode using a first pointer indicating a fill position in the memory buffer and a second pointer indicating a read position in the memory buffer. In the first mode of operation the control unit intermittently signals to the discontinuous interface over the control path connection to provide a segment of data of a first predetermined size over the first data path connection to be stored in the memory buffer at a position ahead of the first pointer, and wherein the control unit intermittently signals the discontinuous interface at a first rate. In the second mode of operation the control unit intermittently signals to the discontinuous interface over the control path connection to read and replace a segment of data of a second predetermined size less than the first predetermined size over the first data path connection at the position in the memory buffer ahead of the first pointer and wherein the control unit intermittently signals the discontinuous interface at a second data rate greater then the first data rate. The continuous interface reads and replaces a block of data stored in the memory buffer over the second data path connection at a position indicated by the second pointer.

A further aspect of the present disclosure is an audio playback device comprising an application processor, an analog-to-digital/digital-to-analog converter (ADDAC) and an audio buffer. The application processor is for intermittently providing data of a first predetermined size, intermittently providing data of a second predetermined size, less than the first predetermined size and intermittently reading data of the second predetermined size. The ADDAC is for continuously reading a block of data from the audio buffer for playback and continuously providing a block of data to the audio buffer from a playback control device. The audio playback device further comprising an input/output connector for coupling the audio playback device to an audio output device and the playback control device. The audio buffer is for storing data and comprises an application processor data path and control path coupled to the application processor, an ADDAC data path coupled to the ADDAC, a memory buffer for storing the data and a control unit having a first mode and second mode of operation, each mode using a first pointer indicating a fill position in the memory buffer and a second pointer indicating a read position in the memory buffer. In the first mode of operation the control unit intermittently signals to the application processor over the application processor control path to provide a segment of output data of a first predetermined size over the application processor data path to be stored in the memory buffer at a position ahead of the first pointer, and wherein the control unit intermittently signals the discontinuous interface at a first rate. In the second mode of operation the control unit intermittently signals to the application processor over the application processor control path connection to read and replace a segment of data of a second predetermined size less than the first predetermined size over the application processor data path connection at the position in the memory buffer ahead of the first pointer and wherein the control unit intermittently signals the application processor at a second data rate greater then the first data rate. The ADDAC reads and replaces a block of data stored in the memory buffer over the ADDAC data path connection at a position indicated by the second pointer.

A still further aspect of the present disclosure is a method of operating an efficient low-latency buffer storing data received from a discontinuous interface and a continuous interface. The method comprises operating the buffer in a first mode comprising determining a state of the buffer (buffer state), determining from the buffer state if more data is to be added to the buffer from a discontinuous interface coupled to the buffer based upon a first set of criteria, replacing continuous data stored in the buffer with discontinuous data of a first predetermined size received from the discontinuous interface, starting at a first position indicated by a first pointer based upon the determined buffer state, reading discontinuous data from the buffer at a second position indicated by a second pointer and replacing the read discontinuous data with continuous data received from the continuous interface. The method further comprises switching the buffer to operate in a second mode comprising determining the buffer state, determining from the buffer state if more data is to be added to the buffer from the discontinuous interface based upon a second set of criteria, reading an amount of continuous data of a second predetermined size from the buffer starting at the first position indicated by the first pointer, replacing the read continuous data stored in the buffer with an amount of discontinuous data of the second predetermined size received from the discontinuous interface, starting at the first position indicated by the first pointer based upon the determined buffer state, reading discontinuous data from the buffer at the second position indicated by the second pointer and replacing the read discontinuous data with continuous data received from the continuous interface.

A still further aspect of the present disclosure is a method of operating an audio playback device comprising an application processor, an analog-to-digital/digital-to-analog converter (ADDAC) and an audio buffer storing output data and input data. The method comprises operating the audio buffer in a first mode comprising determining a state of the buffer (buffer state), determining from the buffer state if more data is to be added to the buffer from the application processor coupled to the audio buffer based upon a first set of criteria, replacing input data stored in the audio buffer with output data of a first predetermined size received from the application processor, starting at a first position indicated by a first pointer based upon the determined buffer state, reading output data from the audio buffer at a second position indicated by a second pointer and replacing the read output data with input data received from the ADDAC. The method further comprises at the ADDAC detecting the presence of input information on an input line of the audio playback device, providing an ADDAC control signal to the application processor, receiving the ADDAC control signal at the application processor and providing a signal to the audio buffer to switch modes of operation, and switching the audio buffer to operate in a second mode. The second mode of operation comprises determining the buffer state, determining from the buffer state if more data is to be added to the audio buffer from the application processor based upon a second set of criteria, reading an amount of input data of a second predetermined size from the audio buffer starting at the first position indicated by the first pointer, replacing the read input data stored in the audio buffer with an amount of output data of the second predetermined size received from the application processor, starting at the first position indicated by the first pointer based upon the determined buffer state, reading output data from the audio buffer at the second position indicated by the second pointer and replacing the read output data with input data received from the ADDAC.

A still further aspect of the present disclosure is an application processor for reading and writing data from and to a bi-directional memory buffer, the application processor configured to: responsive to an indication to write data to the bi-directional memory buffer, read a defined size of input data from the bi-directional memory buffer; replace the input data read from the bi-directional memory buffer with output data of the defined size; and responsive to a mode-change signal, change the defined size of data that is read and written from and to the bi-directional memory buffer.

A still further aspect of the present disclosure is an audio playback device comprising: a bi-directional memory buffer; and an application processor for reading and writing data from and to the bi-directional memory buffer. The application processor is configured to: responsive to an indication to write data to the bi-directional memory buffer, read a defined size of input data from the bi-directional memory buffer; replace the input data read from the bi-directional memory buffer with output data of the defined size; and responsive to a mode-change signal, change the defined size of data that is read and written from and to the bi-directional memory buffer.

A still further aspect of the present disclosure a method in an application processor of reading and writing data from and to a bi-directional memory buffer, the method comprising: responsive to an indication to write data to the bi-directional memory buffer, reading a defined size of input data from the bi-directional memory buffer; replacing the input data read from the bi-directional memory buffer with output data of the defined size; and responsive to a mode-change signal, changing the defined size of data that is read and written from and to the bi-directional memory buffer.

To overcome the requirement of an additional connector for a remote control, some remote controls are capable of sending playback control information over a line-in (mic line or record line) connection that is present on the audio output connection. While this technique addresses the need for an additional remote control connection, it requires that the control information be sent over the mic line as an analog signal, such as a tone or combination of tones, which is the converted to a digital input control data and sent to the application processor of the audio playback device, possibly through a buffer. The application processor may then process the input control data to determine the control information sent by the remote, such as a stop command. Due to cost and size considerations it is desirable to limit the number of buffers required in the audio playback device, and as such the same buffer used for buffering the audio output data may be used for buffering the control input data. The use of the same buffer for buffering data in both the input and output directions can lead to higher latency in receiving the control input data, which is undesirable.

The present technology, in general, enables an audio playback device to provide an efficient and low latency audio buffer capable of buffering both output audio data and input control data. The audio buffer has at least two modes of operation, the first is a high latency mode in which large segments of audio output data can be received and buffered from a discontinuous interface, capable of providing segments of data intermittently, attached to the audio buffer. The high latency mode allows the discontinuous interface to intermittently provide segments of output audio data to the audio buffer and enter a low powered sleep mode in between providing segments. The segments of data buffered from the discontinuous interface are read by a continuous interface and replaced with input control data from the continuous interface. The high latency mode provides power efficiency; however, it also results in a high latency between times at which the discontinuous interface can receive input control data from the audio buffer. High latency may result in, for example a delayed response to user input. The second mode of operation of the audio buffer is a low latency mode, which allows the discontinuous interface to provide smaller segments of output audio data more often, and so provides a lower latency and be more responsive to user input, at the cost of requiring the discontinuous interface to provide data more frequently, which may consume more power.

The audio buffer described herein is presented as being implemented using a First-In First-Out (FIFO) buffer that uses a read and replace strategy for writing data to the FIFO Buffer. In a read and replace buffer, the memory block, or blocks, being written to are first read out so that any data stored in the memory block(s) may be received prior to being replaced. The read and replace strategy allows the FIFO buffer to act as a bidirectional buffer. As described further, and in particular with reference to FIGS. 5 and 6, input control data received from the continuous interface is first read out of the audio buffer prior to being replaced with output audio data from the discontinuous interface. Similarly, the output audio data from the discontinuous interface is first read out of the audio buffer prior to being replaced with input control data from the continuous interface. The 'output' and 'input' description of the data is relative to the discontinuous interface and continuous interface coupled to the audio buffer and not the audio buffer itself, since both the output audio data and input control data may be considered to be both input and output to and from the audio buffer. Output data originates at the discontinuous interface and passes through the audio buffer to the continuous interface, while input data originates at the continuous interface and passes through the buffer to the discontinuous interface.

FIG. 1 depicts in a block diagram, an illustrative audio playback device 100 including an audio buffer 104. The audio playback device 100 may be, for example, an MP3 player, a smart phone or other portable devices capable of audio playback. The audio playback device 100 comprises an application processor 102, an audio buffer 104 an analog-to-digital/digital-to-analog converter (ADDAC) 106 (or codec) and an input/output (I/O) connection 108. An audio output device 110 and playback control device 112 are also shown as being connected to the I/O connection 108.

The application processor 102 may be a processor suitable for executing instructions stored in memory (not shown) of the audio playback device 100. The instructions when executed by the application processor 102, configure the audio playback device 100 in order to provide audio, or output, data to the audio buffer. The output data is digital data that is subsequently converted to an analog signal for playback over the audio output device 110 by the ADDAC 106. The application processor 102 acts as a discontinuous interface to the audio buffer 104. The application processor 102 can intermittently provide segments of output audio data to the audio buffer 104. The application processor 102 is configured to be able to provide different size segments of audio output data to the audio buffer 104 depending on the mode of operation that the audio buffer 104 is operating in. In a first mode, the application processor 102 provides a large segment of output audio data to the audio buffer 104 at a low rate, that is the large segments of output audio data are provided less frequently. In a second mode, the application processor 102 provides a small segment of output audio data to the audio buffer 104 at a high rate, that is the small segments of output audio data are provided more frequently. The relative terms large segment and small segment are described in further detail herein with regards to an audio buffer 104 of an illustrative size.

The audio buffer 104 provides a FIFO memory buffer for temporarily storing output data received from the application processor 102. The audio buffer 104 also provides the FIFO memory buffer for temporarily storing input control data received from the ADDAC 106. The audio buffer 104 provides a bidirectional memory buffer for buffering both output audio data that is received in segments transmitted discontinuously from the application processor 102 and input control data that is received in blocks continuously from the ADDAC 106. As described herein a segment of data comprises a plurality of blocks of data.

The audio buffer 104 provides a control signal to the application processor 102 indicating that more output audio data can be provided. Thus, the audio buffer 104 determines the rate at which the application processor 102 reads and replaces data to the audio buffer 102. As described further herein, and in particular with reference to FIG. 3, the audio buffer 104 provides two modes of operation that determine when to indicate, using the control signal, to the application processor 102 that it can provide more output audio data. Upon receiving an indication from the audio buffer 104 that more output audio data can be provided, the application processor 102 may transition from a low power sleep mode to a high power awake mode in order to provide the output audio data. After providing the output audio data, the application processor 102 may return to the low power sleep mode. The more frequently the audio buffer 104 sends the control signal to the application processor 102 to provide output audio data, the more often the application processor 102 is in the high power awake mode, and the more power will be consumed by the audio playback device 100.

The output audio data that is buffered by the audio buffer 104 is read out continuously, in blocks, by the ADDAC 106, and replaced continuously with input control data from the ADDAC 106. The input control data is intermittently read out from the audio buffer 104, in segments, by the application processor 102 as it is providing more output audio data. The input control data received by the application processor 102 may include playback control information that was transmitted as an audio tone, for example as a particular frequency, or combination of frequencies, by the playback control device 112 over the mic line of the I/O connection 108. The application processor 102 may receive the input control data and process it in order to determine the playback control to initiate, for example pause playback of the audio. The application processor 102 receives, and processes, the input control data in segments when it provides the output audio data to the audio buffer 104. As a result, the more frequently the application processor 102 provides output audio data to the audio buffer 104, the more frequently it will receive input control data. The more frequently the audio processor 102 receives the input control data, the lower the latency will be between a user activating a playback control on the playback control device 112 and the application processor 102 initiating the playback control, for example pausing playback of audio. Although it is desirable to have a low latency for processing the input control data, it requires that the application processor 102 be in an awake state more often, which consumes more power as described above.

The ADDAC 106 is capable of receiving a block of digital output audio data from the audio buffer 104 continuously and converting the digital output audio data into an analog signal that is suitable for playback by the audio playback device 110. The ADDAC 106 is also capable of receiving an analog signal from the mic line connected to, for example, the playback control device 112. The analog signal may include playback control information transmitted by the playback control device 112, and the ADDAC 106 is capable of converting the analog signal into digital input control data that is provided continuously in blocks to the audio buffer 104. The analog-to-digital and digital-to-analog converter portions of the ADDAC 106 may operate simultaneously, so that a block of output audio data may be read out of the audio buffer 104 and replaced with a block of input control data from the ADDAC 106.

The I/O connector 108 provides a physical interface between the audio playback device 100 and the audio output device 110 as well as the playback control device 112. The I/O connector 108 may be provided by various physical connectors including for example, a 3.5 mm jack, or a mini jack. The I/O connector 108 may provide the physical connection for both the output connection and input connection, also referred to herein as the mic line. For example, a 3.5 mm jack may include 4 connection rings, two for different channels of output data, one for the input data and a fourth for a signal ground. It will be appreciated that different physical connections may be easily substituted in place of the described 3.5 mm jack. Additionally the input connection and output connections may be physically separate; however, this may take up additional space in the audio playback device 100, which can present undesirable constraints on the physical size or layout of the audio playback device 100.

The playback control device 112 provides playback control information to the application processor 102 in order to control the operation of the audio playback device 100. The playback control device 112 may be a part of a multi-button headset that provides different controls to a user of the audio playback device 100 as well as an audio output device 110, such as headphones. The playback control device 112 transmits the playback control information over the mic line of the I/O connection 108, as an analog signal. The playback control information may be represented by a tone, or combination of tones. The application processor 102 detects the tone(s), as well as other information present in the input control data, such as the length of the tone(s) and the time between them, in order to determine the controls that have been activated by the user and initiate the appropriate control of the audio playback device 100. The control information transmitted from the playback control device 112 is converted by the ADDAC 106 into digital input control data and temporarily stored by the audio buffer 104 prior to being read and processed by the application processor 102.

The audio playback device 100 may include an ADDAC control signal line 114, which is coupled to the application processor 102. The ADDAC control signal line 114 can be used by the ADDAC 106 to signal to the application processor 102 that control information, for example the tone(s) of playback control information, has been detected on the input line of the ADDAC 106. Although it is possible for the ADDAC 106 to detect the presence of control information on the input line, the ADDAC 106 does not have the processing power necessary to process the control information. As a result the ADDAC 106 signals to the application processor 102, using the ADDAC control signal line 114, that control information has been detected. Upon receiving the signal from the ADDAC control signal line 114, the application processor 102 switches modes, which determines the size of the segments read and written to the audio buffer 104 in each buffer cycle. The application processor 102 also signals to the audio buffer 104 to change modes in order to provide a low latency path for the detected control information. The audio buffer 104 changes modes, which causes the audio buffer 104 to signal to the application processor 102 that it can provide more output data more frequently. The application processor 102, which has also switched modes, provides the smaller segments of output audio data to the audio buffer 104 when signaled. As a result, the application processor 102 will receive the signal from the audio buffer 104 more frequently and will read the input control data from the audio buffer 104 more frequently prior to providing segments of output audio data, which will be of a smaller size.

Figure 2:
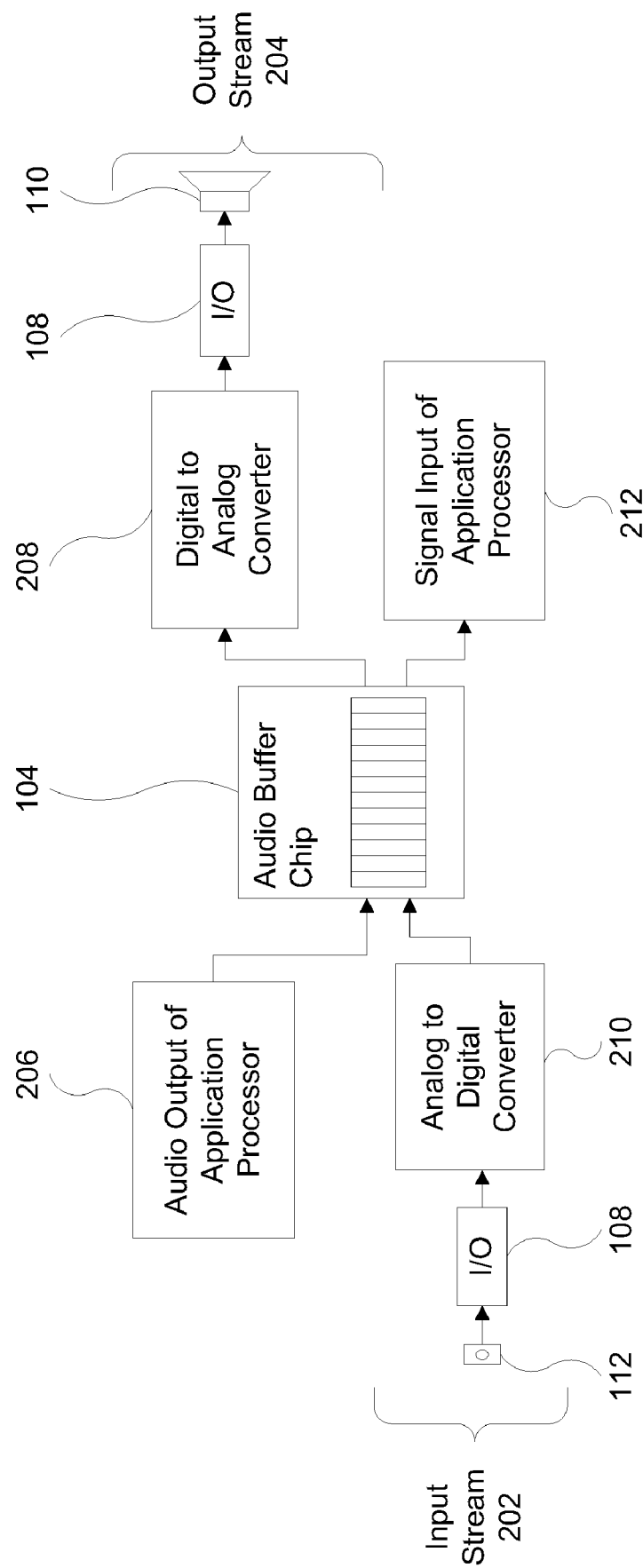
FIG. 2 depicts in a block diagram, communication paths of an illustrative audio playback device.

FIG. 2 depicts in a block diagram, communication paths of an illustrative audio playback device, such as audio playback device 100. The components of audio playback device 100 have been logically separated to highlight the input stream 202 and output stream 204. The input stream 202, which comprises a stream of input control data, begins at the playback control device 112. The playback control device 112 generates control information, for example as a tone or combination of tones, that is transmitted over the mic line of the I/O connection 108 as an analog signal. The analog input signal is received at the Analog-to-Digital converter (ADC) component 310 of the ADDAC 106, which converts the analog input signal into a stream of digital input control data which is temporarily stored in the audio buffer 104. The input control data is then read out of the audio buffer 104 by, or provided to, the signal input 212 of the application processor 102. The output stream 204, which comprises a stream of output audio data, begins at the audio output 206 of the application processor 102. The audio output 206 intermittently provides output audio data to the audio buffer 104. The output audio data is then read out of the audio buffer 104 by, or provided to, the digital-to-analog converter (DAC) component 208 of the ADDAC 106. The digital-to-analog converter component 208 then converts the digital output audio data into an analog output signal which is provided to the audio output device 110, via the output connection of the I/O connector 108.

It will be appreciated that both the input stream 202 and the output stream 204 are synchronized at the audio buffer 104 as a result of the read and replace nature of the audio buffer 104. That is, output of the output audio data to the DAC 208 is synchronized with the input of the input control data from the ADC 210, so that a block of output audio data is first read by, or provided to the DAC 208, and then is replaced with a block of input control data from the ADC 210. Similarly, the input stream and output streams are synchronized at the application processor 102, in that a segment of input control data is read by, or provided to, the signal input 212 and replaced with a segment of output audio data. As described further herein, the size of the segment of input control data and output audio data that is read and replaced is predetermined, but varies depending on the mode of operation of the audio buffer 104.

Figure 3:
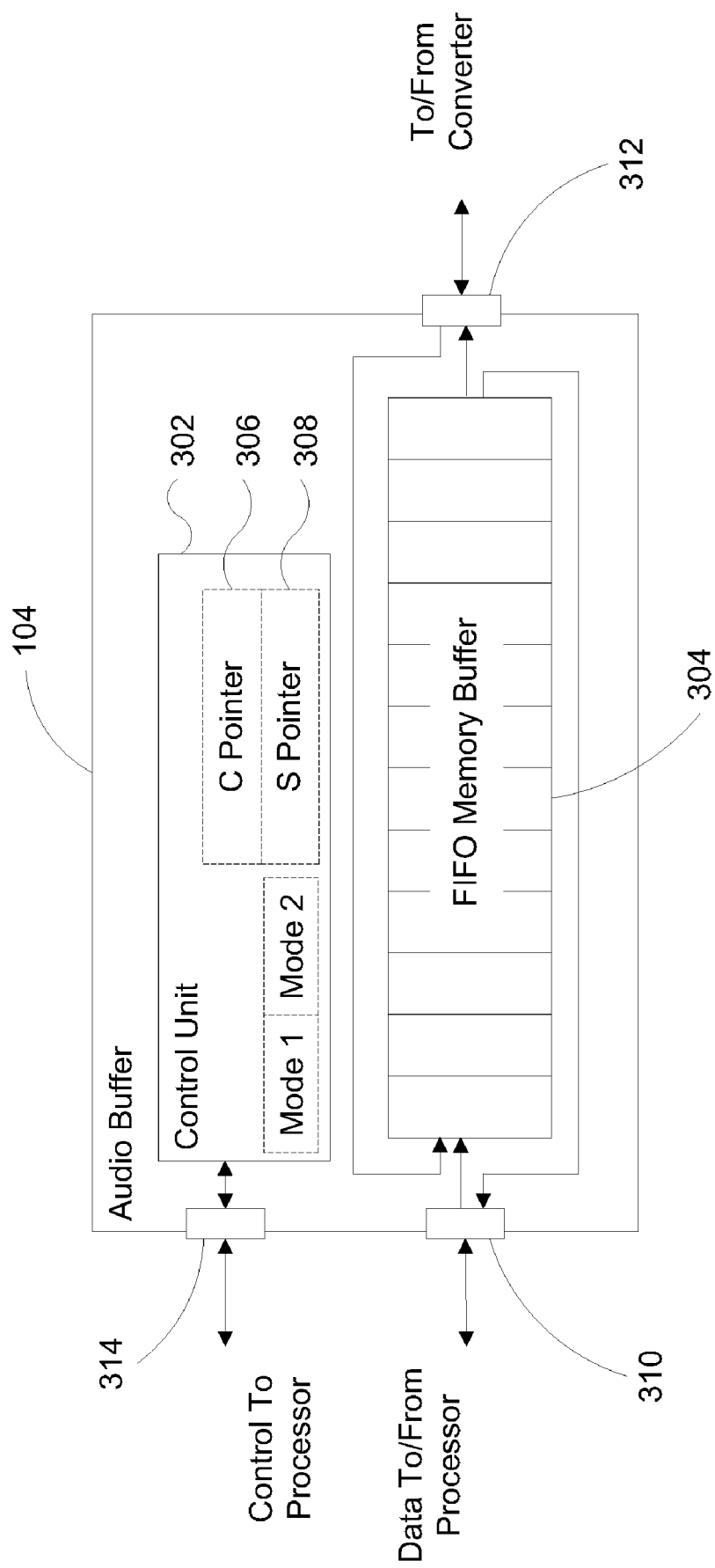
FIG. 3 depicts in a block diagram, an illustrative audio buffer.

FIG. 3 depicts in a block diagram, an illustrative embodiment of audio buffer 104. Although the audio buffer 104 is described as being connected to the application processor 102 and the ADDAC 106 of audio device 100, it will be appreciated that the audio buffer 104 may be used to provide a bidirectional buffer between any discontinuous interface, capable of reading and replacing data of different predetermined sizes intermittently, and a continuous interface capable of reading and replacing data of a predetermined size continuously. The discontinuous interface typically is capable of providing data to the audio buffer 104 at a higher rate than the continuous interface, which allows the discontinuous interface to read and replace segments of data in a single buffer cycle, as described further with reference to FIGS. 5 and 6.

The audio buffer 104 comprises a control unit 302 that determines when to signal to the discontinuous interface to provide additional output audio data to the audio buffer 104. For the clarity of the description, the discontinuous interface is considered to be provided by the application processor 102. The continuous interface continuously reads the output audio data temporarily stored in the audio buffer 104 and replaces it with input control data. For the clarity of the description, the continuous interface is considered to be provided by the ADDAC 106. The control unit 302 has two modes of operation that determine when to signal to the application processor 102 to provide additional output audio data. The audio buffer 104 further includes a FIFO memory buffer 304 for temporarily storing both input control data and output audio data. The FIFO memory buffer 304 is depicted as providing storage for twelve blocks of data. It will be appreciated that this is done merely for simplicity and clarity of the description. A memory buffer may provide, for example 32 kilobytes of data. However, it will also be appreciated that this size is not an actual limitation, but is a balance between physical size of the memory, cost of the memory and power requirements of the memory and may be made larger or smaller as design requirements and limitations dictate.

The control unit 302 uses two pointers 306, 308 that point to a memory location in the FIFO memory buffer 304. One pointer is referred to as the C pointer 306, which indicates the current memory location of the FIFO buffer memory 304 that is being read and replaced. The other pointer is referred to as the S pointer 308 and indicates the last filled position, or the end or stop position, in the FIFO buffer memory 304. The control unit 302 uses both the C pointer 306 and S pointer 308 in order to determine when to signal to the application processor 102 to provide additional output audio data. The control unit 302 may also utilize the size (b) of the FIFO memory buffer 304 as well as a watermark (W) of the audio buffer when determining when to signal for additional output audio data. W may also be used by the application processor 102 in order to determine the predetermined size of the segment of output audio data that is provided to the audio buffer 104 in each mode of operation. If the application processor 102 is responsible for determining the predetermined size of the segment of output audio data to provide to the audio buffer 104 in each mode, then the application processor 102 and audio buffer 104 must utilize the same value for W. If the application processor 102 and buffer 104 do not use the same value of W, the audio buffer may signal to provide more output audio data, and the application processor 102 may provide more output audio data than can be stored in the FIFO buffer memory 304. Rather than having the application processor 102 determine the size of the segment of output audio data to provide when signaled by the audio buffer 104, the audio buffer 104 may signal to the application processor 102, in addition to the signal indicating to provide additional output data, the segment size of the additional output audio data to be provided.

The audio buffer 104 is coupled to the application processor 102 via an application processor data path 310 as well as a control path 314. The application processor data path 310 is used to receive and provide data from the application processor 102. The control path 314 provides for control communication between the application processor 102 and the audio buffer 104. The control communication may include communication from the application processor 102 signaling to the audio buffer 104 to switch modes and communication to the application processor 102 signaling it can provide additional output audio data to the audio buffer 104. The control communication may also communicate additional information, such as the size of the output audio data to be provided, the values of the C pointer 306 and S pointer 308, the value of W and the size of the FIFO buffer memory 304. The audio buffer 104 is also coupled to the ADDAC 106 via an ADDAC data path 312. The audio buffer 104 may also communicate control information to the ADDAC 106, for example over an ADDAC control path; however this is not shown for simplicity. Furthermore, it will be appreciated that while the control path 314 and application processor data path 310, as well as the ADDAC data path 312 and ADDAC control path (not shown), are described as physically separate paths, the data and control paths may be combined together on a control and data path.

As described above, the control unit 302 determines when to signal to the application processor 102 that it may provide additional output audio data. The control unit 302 may determine this based on the mode of operation it is operating in and at least the values of the C pointer 306 and the S pointer. In the first mode of operation the control unit 302 determines when to signal for additional output audio data by determining the buffer state based on at least the values of the pointers 306, 308 and evaluating the determined buffer state against at least a first criteria. When operating in the second mode, control unit 302 determines when to signal for additional output audio data by determining the buffer state based on at least the values of the pointers 306, 308 and evaluating the determined buffer state against at least a second criteria. As described further below, not only is the criteria used to evaluate the buffer state against different in the first and second modes of operation, the determination of the buffer state may also differ in each mode of operation As an example, in the first mode of operation, the control unit 302 determines the buffer state by evaluating the expression $(S-C) \mod b$. The first criteria that the determined buffer state is evaluated against is buffer state<W. In the second mode, the control unit 302 determines the buffer state by evaluating the expression $(C-S) \mod b$. The second criteria that the determined buffer state is evaluated against is buffer state>W. Where:

C is the value of the C pointer 306;
S is the value of the S pointer 308;
b is the size of the FIFO memory buffer 304; and
W is the value to the watermark of FIFO memory buffer 304.

In the first mode of operation, the size of the segment of data that is read and replaced, starting at the memory location indicated by the value S pointer +1, is predetermined as (b−W). In the second mode of operation, the size of the segment of data that is read and replaced, starting at the memory location indicated by the value of S pointer +1, is predetermined as W. As described above, the predetermined sizes of the segments may be determined by the application processor 102, or may be communicated to the application processor by the audio buffer 104 when an additional segment of data is requested by the audio buffer.

As the audio buffer 104 adds additional output audio data from the application processor 102, the value of the S pointer 308 is updated to reflect the last position filled in the FIFO memory buffer 304. That is the size of segment data read and replaced is added to the value of the S pointer 308.

Similarly, as the audio buffer reads blocks of output audio data and replaces it them with blocks of input control data, the value of the C pointer 306 is incremented accordingly. Furthermore, the new values of the pointers may be modified in order that the pointers return to the beginning of the FIFO buffer memory. For example the new value of the C pointer 306 may be determined by $C=(C+1) \mod b$.

It will be appreciated that the terms continuous and discontinuous are used relative to the cycle of the audio buffer. For example, a single cycle of the audio buffer may read/replace multiple blocks of data from the FIFO memory buffer 304.

Thus the continuous interface reads/replaces data from/to the audio buffer 104 during each cycle, while the discontinuous interface reads/replaces data from/to the audio buffer 104 only during certain cycles.

Figure 4:
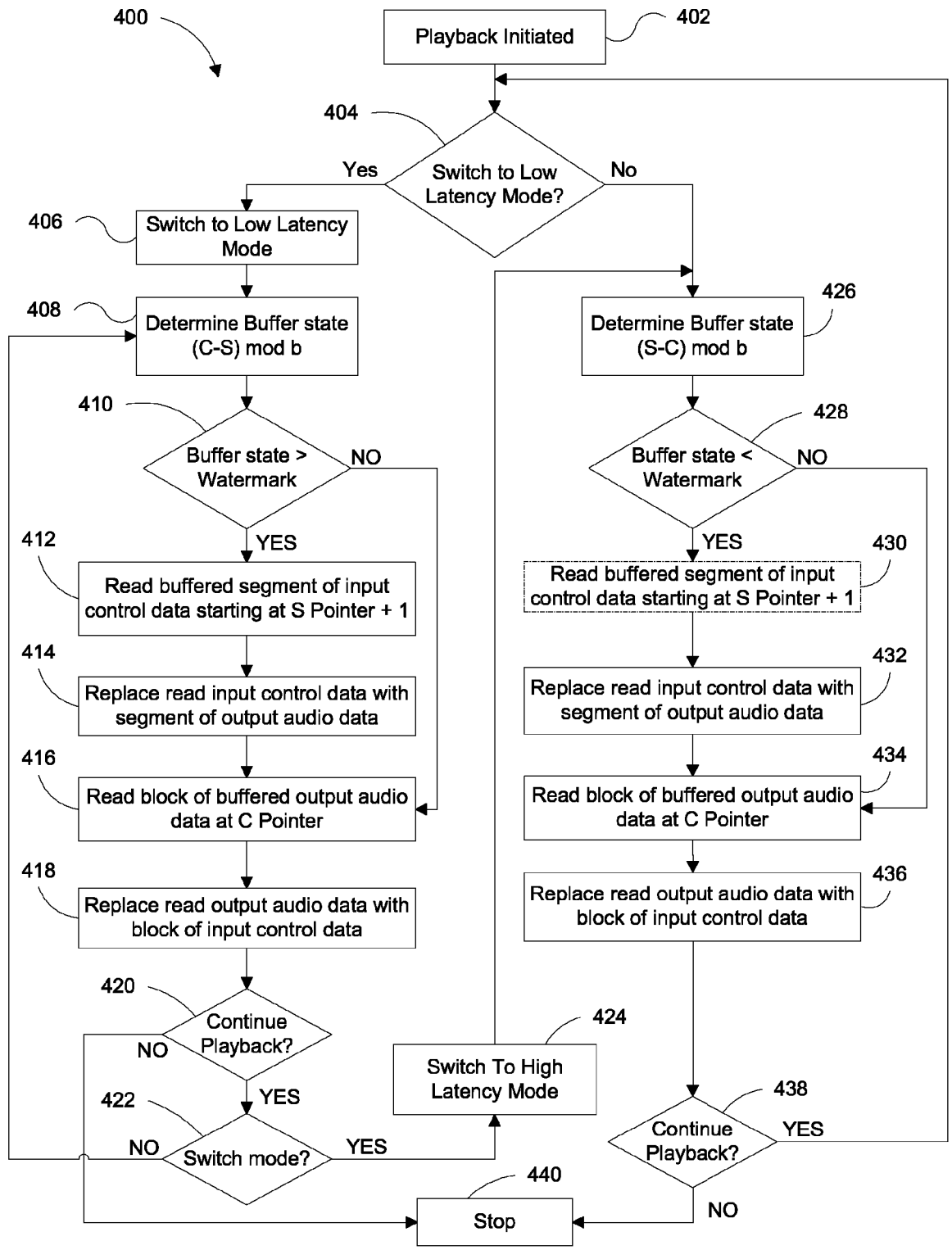
FIG. 4 depicts in a flowchart, an illustrative method of operating an audio buffer.

FIG. 4 depicts in a flowchart, an illustrative method 400 of operating an audio buffer, for example audio buffer 104 in an audio playback device 100. The method 400 begins when audio playback is initiated (402). It is assumed for the sake of simplicity of the description that playback is initiated into the high latency mode. During audio playback, the application processor 102 will provide segments of output audio data to the audio buffer 104 when signaled by the audio buffer 104. The size of the segments is determined based on the operating mode of the audio buffer 104. Once playback is initiated (402), the method 400 determines whether to switch to the low latency mode (404). If it is determined to switch to the low latency mode (Yes at 404), for example upon receiving at the application processor 102 an indication via the ADDAC control signal line 114 that playback control information has been detected on the mic line, the method switches to the low latency mode (406). This switch to the low latency mode may include switching the application processor 102 to a low latency mode in which the size of the segments of data read and replaced from and to the audio buffer is smaller, for example W, as well as switching the audio buffer 104 to the low latency mode of operation, which results in signaling for data from the application processor 102 more frequently. Once the method 400 has switched to the low latency mode, the buffer state is determined according to the equation (C–S) mod b (408). It is then determined if the buffer state is greater than W (410). If the buffer state is greater than W (Yes at 410), a segment of buffered input control data is read from the buffer starting at the location indicated by S pointer +1 (412). The size of the segment is predetermined and may be for example W. The segment of input control data just read is then replaced with a segment of output audio data received from the application processor 102(414) of a corresponding segment size.

Although not depicted in FIG. 4, it will be appreciated that the value of the S pointer 308 may be updated to reflect the new position of the last data block in the buffer. A block of buffered output audio data is read from the audio buffer 104 from the memory position indicated by the C pointer 306 (416). The read block of output audio data is then replaced with a block of input control data from the ADDAC 106(418). Although not depicted in FIG. 4, the value of the C 306 pointer is updated, after replacing the read block of output audio data with the block of input control data, for example with the value of C pointer +1. After replacing the read output control data it is determined if playback should continue (420). If it is determined that playback should not continue (No at 420) than playback is stopped (440). If playback is to continue (Yes at 420), it is determined if operating modes should be switched (422). The determination as to whether or not to switch modes (422) may be made based on time, for example the audio buffer 104 remains in the low latency mode for 1 second, or on other conditions such as the length of time to execute an playback control received as the input control data. The application processor 102 may determine when to switch modes, for example based on a signal received from the ADDAC 106, and signal the same to the audio buffer 104. Regardless of how it is determined, if it is determined not to switch modes (No at 422), the buffer state is determined again using the equation (C–S)mod b(408). Again it is determined if the buffer state is greater than W (410). If it is not greater than W (No at 410) the method does not read input control data and replace it with output audio data received from the application processor 102 (Steps 412, 414). Instead the buffered output audio data is read (416) and replaced with input control data received from the ADDAC 106 (418).

When operating in the high latency mode, whether because it was determined that it was not necessary to switch to the low latency mode (No at 404), or it was determined to switch to the high latency mode (Yes at 422), the method determines the buffer state according to the equation (S–C) mod b (426). It is determined if the buffer state is less than W (428). If it is (Yes at 428), a buffered segment of input control data may be read out of the buffer memory starting at the memory position indicated by S pointer +1 (430). Reading out the input control data may be optional in the high latency mode, as it is assumed that while operating in the high latency mode there is no control information transmitted by the playback control device 112 present in the input control date. However the input control data may be read out and discarded by, for example, the application processor 102, or may be read and utilized, for example for diagnostics or statistics. Regardless of a segment of input control data being read from the buffer, it is replaced with a segment of output control data received from the application processor (432). The size of the segment of data that is optionally read and replaced may be determined by (b–W). The method reads the block of buffered output audio data located at the position indicated by C pointer 306 (434) and then replaces the read output audio data with a block of input control data received from the ADDAC 106 (406). The method then determines if playback should continue (438), and if it shouldn't (No at 438) playback is stopped (440). If it is determined that playback should continue (Yes at 438) the method returns to determine if it should switch to the low latency mode (404).

If in the high latency mode, it is determined that the buffer state is not less than W (No at 428), no segment of output audio data is added to the audio buffer 104, rather output audio data is only read out of the audio buffer 104 at the location indicated by C pointer 306 (434) and replaced with input control data received from the ADDAC 106 (436).

It will be appreciated that the values of the S and C pointers are updated accordingly while operating in the high latency mode, as was described above for the low latency mode. For example, the S pointer is updated with the value of S pointer+ (b–W) each time a segment of input control data is replaced with output audio data received from the application processor 102 (432). Similarly the value of the C pointer is incremented each time a block of output audio data is replaced with input control data received from the ADDAC 106.

Figure 5:
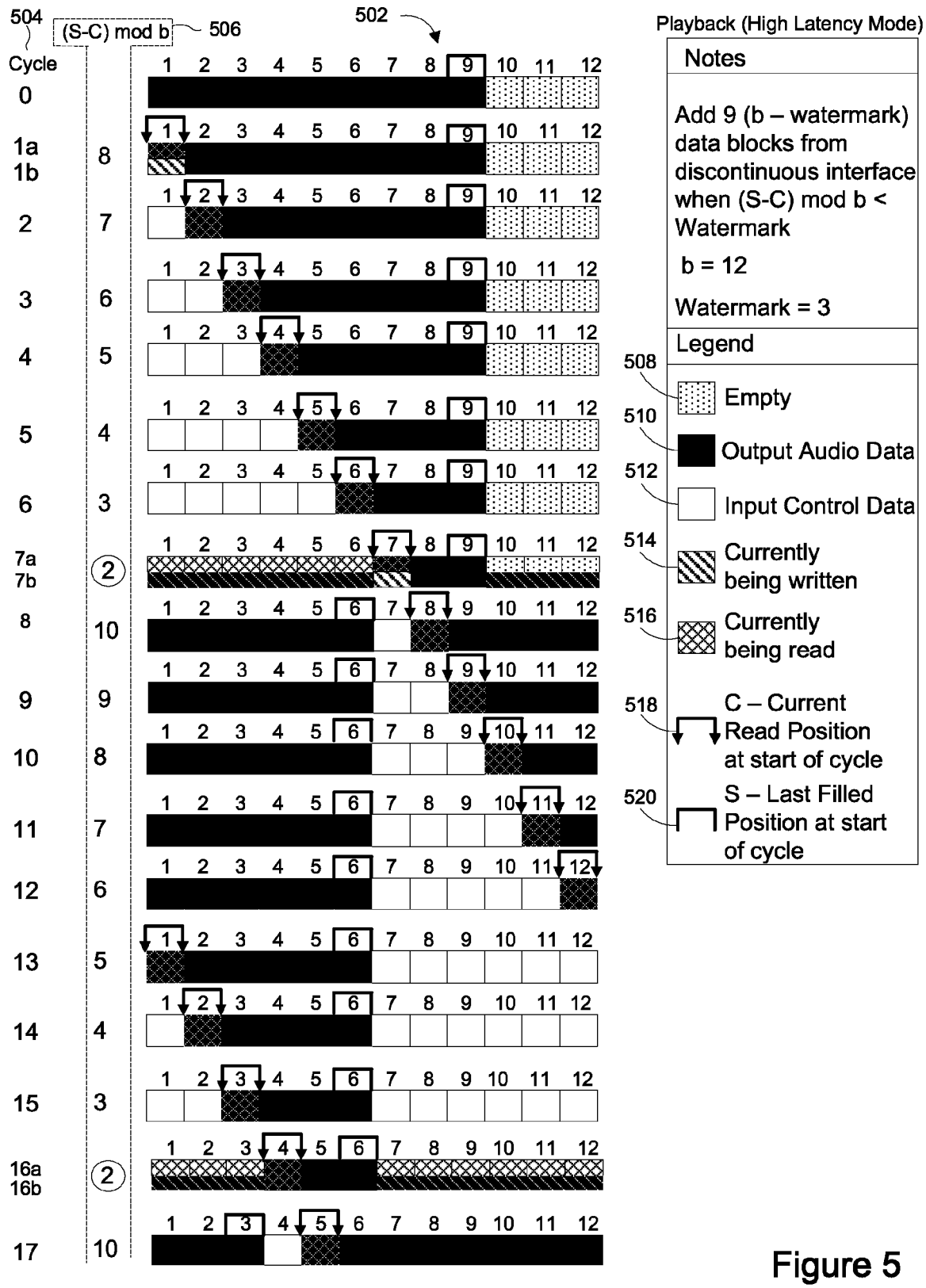
FIG. 5 depicts in a memory diagram, an illustrative memory buffer during the operation of an illustrative audio buffer in a first mode of operation.

FIG. 5 depicts in a memory diagram, an illustrative memory buffer during the operation of an illustrative audio buffer in a first mode of operation. FIG. 5 depicts the memory contents of a memory buffer 502 operated in accordance with the high latency mode described above. FIG. 5 depicts the memory contents 502 through numerous buffer cycles 504. As is apparent in FIG. 5, the buffer frequency, that is the frequency at which the buffer cycles occur 504, may be much lower than the memory frequency, that is the frequency at which memory blocks can be written to the FIFO buffer memory. As such, in each buffer cycle, multiple blocks of data can be read and replaced, even though the FIFO buffer memory can only perform one operation at a time, each individual block in the FIFO buffer memory can only do one operation per memory cycle. Thus, a number of memory cycles occur within each buffer cycle. For example the cycle frequency of the audio buffer may be 48 kHz, while the memory frequency of the buffer memory may be in the range of 2-20 MHz. It will be appreciated that these illustrative values are provided merely for the sake of clarity and the exact timing between the FIFO buffer memory frequency, the buffer cycle frequency and other timing concerns may vary depending on the particular timing requirements of the memory and other components coupled to the audio buffer 104. The timing may be provided by an internal oscillator of the audio buffer, or an external timing signal, which may be divided or multiplied to achieve the frequencies required by the FIFO buffer memory and the buffer cycle frequency.

In FIG. 5 the memory contents of the FIFO buffer memory 502 are depicted from memory location 1 to 12 through numerous buffer cycles 504 0-17. The buffer state is indicated 506 as determined for each cycle according to the equation for the high latency mode, namely (S−C) mod b. Also depicted are the positions of the C pointer and S pointers. The length of the buffer b in this example is 12 and W is assumed to be 3. W may be chosen as a percentage of the size of the buffer, for example 1-30%. The contents of each block of memory may either by empty 508, filled with output audio data 510 or filled with input control data 512. Furthermore, the state of the block is depicted by either by a diagonal pattern 514 if the memory block is being written to in the current buffer cycle or a hatch pattern 516 if the memory block is being read from in the current buffer cycle. As described above, more than one memory operation can occur within a single buffer cycle, and as such multiple memory blocks can be read and/or written in a single buffer cycle.

The initial state of the buffer (Cycle 0) has memory blocks 1-9 filled with output audio data 510, and memory blocks 10-12 empty 508. The first cycle begins with the C pointer 518 at position 1. The buffer state is determined to be 8, according to (S−C) mod b, which is greater than W, so no segment of output audio data will be added in the buffer cycle. A block of output audio data 510, at the position indicated by the C pointer, is first read out to the ADDAC 106 and then replaced with input control data 512 that is continuously received from the ADDAC 106. Cycle 1 has been broken up into two sub steps 1a and 1b to highlight the reading of the output audio data and subsequent replacing of the read data with the input control data. After the block data is replaced, the value of the C pointer is updated, for example from 1 to 2 as reflected in the next cycle, and the process continues. Subsequent cycles of reading output audio data and replacing it with input control data are depicted in cycles 2 to 6. These cycles only show the data being replaced at the C pointer position for simplicity.

At cycle 7 the buffer state is determined to be 2 according to (S−C) mod b, which is less than W, and so a segment of output audio data will be added to the buffer in this buffer cycle. A segment of the input control data is read from the buffer and then replaced with the segment of output audio data. The size of the segment of data is determined by (b−W), in this example 9. The 9 block segment of input control data is read and replaced starting at the position indicated by S pointer +1. After reading the input control data and replacing it with the 9 block segment of output audio data, the S pointer is updated to reflect the new last fill position, namely 6 which is S pointer+(b−W) mod b, as reflected by the position of the S pointer at the beginning of the next cycle. Once the 9 block segment of output audio data is placed in the audio buffer, one block of output audio data is read from the buffer, the ADDAC 106, and replaced with one block of input control data at the location indicated by the C pointer, which is subsequently updated.

The reading of the output audio data, from the location indicated by the C pointer, and replacement with the input control data continues as described above through cycles 8-15, and since the buffer state is determined to be greater than W in each buffer cycle no segments of output audio data are added to the audio buffer. At cycle 16, the buffer state is determined to be 2, which is less than W, and so another 9 block segment of audio data is provided to the audio buffer after reading the 9 block segment of input control data from the location beginning at the location indicated by the S pointer. After replacing the segment of input control data with the new segment of output audio data, a block of output audio data is read from the audio buffer and replaced with a block of input control data at the location indicated by the C pointer.

As is apparent from FIG. 5, the application processor 102 reads, or receives, a segment of input control data, which may contain control information from the playback control device 112, each time the audio buffer receives a new segment of output audio data. In the high latency mode, the audio buffer signals to the application processor to provide large segments of data only when the FIFO buffer memory 304 is nearly empty. It will be appreciated that the FIFO buffer memory may be considered as empty if the C pointer is equal to the S pointer, or within a particular threshold of each other. The size of the segments may be determined by the size of the memory buffer minus the Watermark of the FIFO buffer memory (b−W). W may be chosen as a percentage of the size of the FIFO buffer memory, for example 10%. In the high latency mode the audio buffer receives large segments of output audio data intermittently, at a low rate, from the application processor, continuously provides blocks of the output audio data to the ADDAC 106, and signals to the application processor 102 to provide another segment of output audio data once the buffer is nearly empty. While the high latency mode allows the application processor 102 to be in the low power sleep mode for long periods of time as the output audio data of the added segment is slowly read out by, or provided to, the ADDAC 106, it also means that the application processor 102 will need to wait a long period of time before receiving the input control data.

In order to lower the latency between receiving input control data at the ADDAC 106 and providing it to the application processor 102, a low latency mode of operation is provided by the audio buffer 104. The operating mode of the audio buffer 104 may be controlled by the application processor 102. When the ADDAC 106 detects control information, such as a tone or combination of tones, on the mic line coupled to the ADDAC 106, the ADDAC 106 provides a signal to the application processor 203 that causes the application processor 102 to operate in a low latency mode, which reads a replaces smaller segments of data when signaled by the audio buffer 104. The application processor may provide a signal to the audio buffer 104 to signal to it to switch to the low latency mode.

Figure 6:
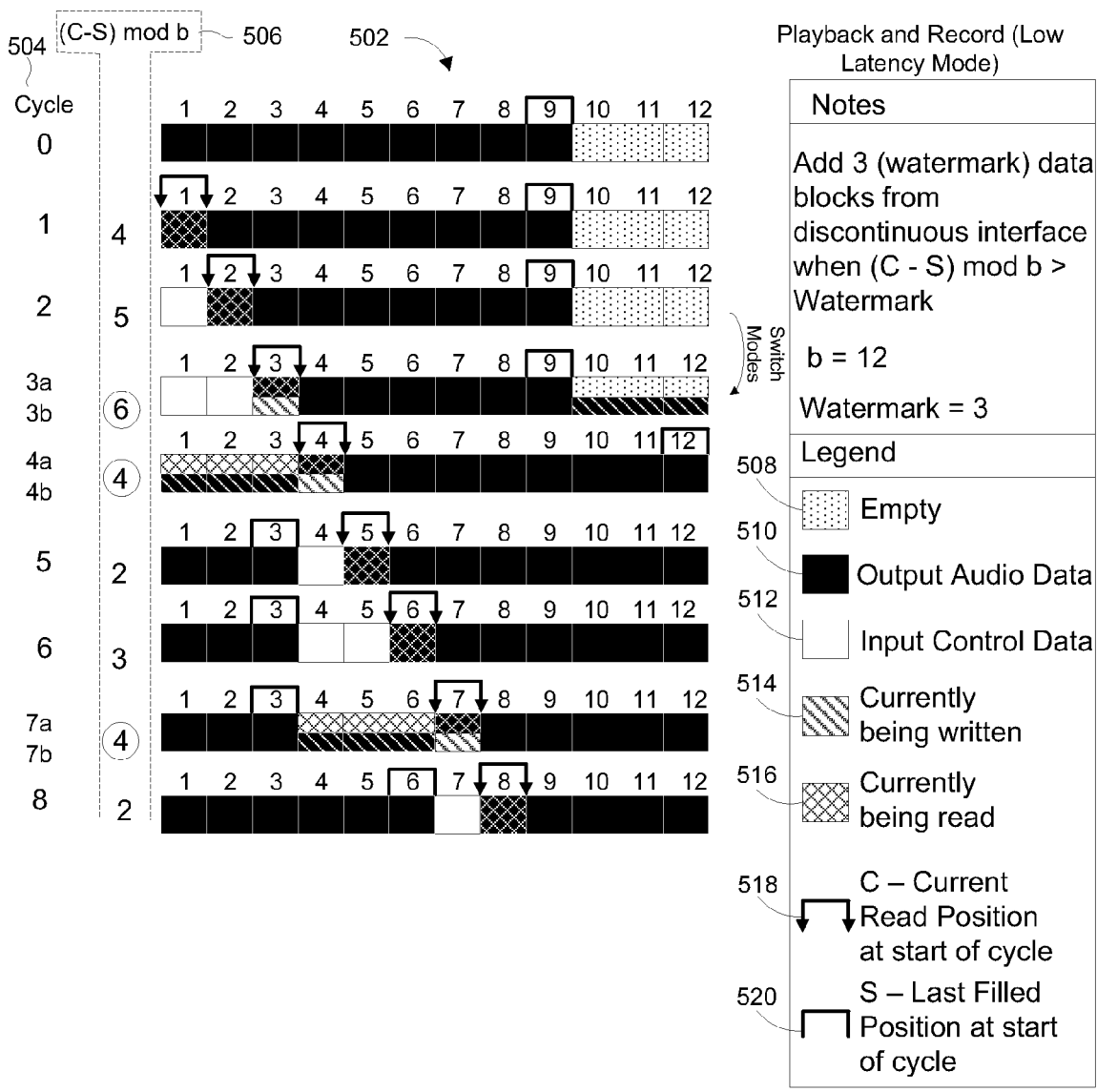
FIG. 6 depicts in a memory diagram, an illustrative memory buffer during the operation of an illustrative audio buffer in a second mode of operation.

FIG. 6 depicts in a memory diagram, an illustrative memory buffer during the operation of an illustrative audio buffer in a second mode of operation in accordance. FIG. 6 is similar to FIG. 5; however, at the end of cycle 2 the audio buffer is switched to the low latency mode of operation. It should be noted that in cycles 1 and 2 of FIG. 6, the audio buffer is operating in the high latency mode, the buffer state is determined according to (S−C) mod b, and the audio buffer signals the application processor for additional audio data when the buffer state is less than the Watermark. At cycle 3, the audio buffer is operating in the low latency mode and the buffer state is determined to be 6 according to (C−S) mod b, which is greater than W and so a segment of input control data is read from the audio buffer 104 and replaced with a segment of output audio data received from the application processor 102. The segment size of the data that is read and replaced during the low latency mode may be determined by W, which in this example is 3. As shown at cycle 3, a small segment of input control data is read and replaced with a small segment of output audio data from the location indicated by the S pointer +1. A block of output audio data is also read from the audio buffer, by the ADDAC 106, and replaced with a block of input control data received from the ADDAC 106.

As depicted in FIG. 6, a segment of input control data is read by the application processor 102 at cycles 3, 4 and 7. As is apparent from FIG. 5 and FIG. 6, the application processor 102 receives the input control data quicker in the low latency mode than in the high latency mode. As a result of the two modes, the audio buffer 104 may be used to provide an efficient low latency audio buffer for use in an audio playback device 100. The efficiency is provided by the high latency mode in which the application processor 102 may conserve power by sleeping in between periodically waking up to provide large segments of output audio data to the audio buffer 104, when signaled to do so by the audio buffer 104. The low latency is provided by the low latency mode, which may be switched to when the ADDAC 106 detects control information on the mic line. The low latency mode causes the audio buffer 104 to signal to the application processor to provide smaller segments of data more frequently. The application processor 102 also reads small segments of input control data from the audio buffer each time it is signaled to provide addition output audio data.

FIGS. 5 and 6 describe an illustrative embodiment of an audio buffer 104 using a FIFO memory buffer 304. The memory buffer size is described as (b). It is understood that the memory buffer could be implemented within physical memory of a size (B) greater than, or at least equal to, b. The amount of physical memory used by the memory buffer may vary and may be configurable. For example the memory buffer may use all of the available physical memory (b=B), or may use a smaller portion of the available physical memory (b<B). In addition to the size of the memory buffer (b) being configurable, the value of the watermark (W) may also be configurable. The largest possible value for W is one less than memory buffer size (b); however the value of W may be chosen to be a smaller percentage of the memory buffer size (b). The value of W may range from 0 to b−1. For example the memory buffer size (b) in FIGS. 5 and 6 is 12, while the value of W is set to 3. Furthermore, the particular timing and ordering of the memory operations, for example reading and replacing data, described above may vary depending on the type of memory used to implement the buffer. For example, the number of operations possible per memory cycle may change if the memory buffer is implemented using unified memory as opposed to dual ported memory.

Various embodiments of an audio buffer 104 have been described above as providing a bidirectional buffer between an application processor 102 and an ADDAC 106. The application processor 102 provides output audio data to the audio buffer and receives input control data from the audio buffer. Similarly the ADDAC 106 receives output audio data from the audio buffer and provides input control data to the audio buffer.

The above description has referred to output audio data being transferred from the application processor to the ADDAC for output by an audio output device, and input control data being transferred from a playback control device to the ADDAC and then to the application processor. These descriptions have been used above for the clarity of the description. The data that is output from the application processor to the ADDAC does not need to be audio data, it could be for example output control data, or more generally any output data. Similarly, the input control data could be for example input audio data, or more generally any input data.

It will be apparent that the audio buffer may be used in applications other than an audio playback device. The audio buffer, or more generally an efficient low latency buffer, may provide a bidirectional buffer between two interfaces. The first interface, which may be referred to as the discontinuous interface and was described above as the application processor 102, can provide different predetermined sized segments of data intermittently when signaled by the audio buffer. The discontinuous interface may be able to quickly read and replace the data from and to the audio buffer. The second interface, which may be referred to as the continuous interface and was described above as the ADDAC 106, can continuously read and replace a block of data with another block of data.

The audio buffer 104 may be implemented as a separate buffer chip that is connected to both the ADDAC and the application processor. Alternatively the audio buffer 104 may be implemented within either the application processor 102 or the ADDAC 106. Furthermore, it will be apparent to one skilled in the art that the audio buffer 104 may read and replace data in various ways. Generally the process described above was to determine the buffer state, read and replace with a segment of output audio data and then read and replace with a block of input control data. Certain steps described could be reordered, or carried out in parallel. For example, the buffer state may be determined at the end of a cycle. The segment of output audio data may be added to the buffer after reading a block of output audio data and replacing it with a block of input control data.

Further still, the particulars for implementing the actual reading and replacing of the data may vary. For example, the application processor 102 has been described above as determining the size of the segment of data that is to be read and replaced. The audio buffer may indicate to the application processor the size of the segment to be read and replaced. Further still, the above has described the audio buffer as being responsible for the reading and replacing of data in the FIFO buffer memory. Alternatively, the audio buffer may provide the relevant pointers to the application processor 102 in order to allow the application processor 102 to read and replace the data directly with the FIFO buffer memory.

The efficient low latency buffer may comprise a single hardware component that can be incorporated into portable devices that provide portable audio playback. The single hardware component may combine hardware, firmware and software in order to implement the efficient low latency buffer described herein. Alternatively, the efficient low latency buffer may be implemented by the hardware components of the portable device and may include software expressed as a series of computer executable instructions that configure the hardware of the portable device to implement the efficient low latency buffer described herein. In other words, these method steps can be implemented as coded instructions in a computer program product or machine-readable medium which, when loaded into memory and executed on the microprocessor of a portable device, perform the steps of the various methods described herein.

This efficient low latency buffer has been described in terms of specific implementations and configurations which are intended to be illustrative only. The scope of the exclusive right sought by the Applicant is therefore intended to be limited solely by the appended claims.

What is claimed is:

1. An application processor for reading and writing data from and to a bi-directional memory buffer, the application processor configured to:
   responsive to an indication to write data to the bi-directional memory buffer, read a defined size of input data from the bi-directional memory buffer;
   replace the input data read from the bi-directional memory buffer with output data of the defined size; and
   responsive to a mode-change signal, change the defined size of data that is read and written from and to the bi-directional memory buffer, wherein the mode-change signal indicates one of a plurality of modes for the application processor to operate in, a first mode reading and writing a first size of data at a first rate, and a second mode reading and writing a second size of data greater than the first size of data at a second rate less than the first rate,
   wherein:
   in the first mode of operation the application processor receiving intermittently signals from a discontinuous interface at a first rate to provide a segment of data of a first predetermined size over a first data path connection to be stored in the bi-directional memory buffer; and
   in the second mode of operation the application processor receiving intermittently signals from the discontinuous interface at a second data rate greater than the first data rate to read and replace a segment of data of a second predetermined size less than the first predetermined size over the first data path connection at a position in the bi-directional memory buffer;
   wherein a continuous interface reads and replaces a block of data stored in the memory buffer over the second data path connection.

2. The application processor of claim 1, further configured to receive the indication to write data from the bi-directional memory buffer.

3. The application processor of claim 1, further configured to generate the indication to write data to the bi-directional memory buffer at a frequency inversely proportional to the defined size of data that is read from and written to the bi-directional memory buffer.

4. The application processor of claim 1, further configured to process the read input data to identify one or more control commands.

5. The application processor of claim 1 wherein the indication to write data to the bi-directional memory buffer is received via an analog-to-digital/digital-to-analog converter (ADDAC) control signal line.

6. The application processor of claim 1 wherein:
   the bi-directional memory buffer is of a predetermined size (b);
   the first predetermined size is given by b minus a watermark (W) of the bi-directional memory buffer;
   the second predetermined size is W;
   a second pointer indicates a current read position (C) of the bi-directional memory buffer;
   a first pointer indicates a replace position (S) of the bi-directional memory buffer;
   in the first mode, the application processor signals to the discontinuous interface when (S-C) mod b is less than W; and
   in the second mode, the application processor signals to the discontinuous interface when (C-S) mod b is greater than W,
   wherein b is an integer greater than 1, W, C, and S are integers greater than or equal to 0.

7. An audio playback device comprising:
   a bi-directional memory buffer; and
   an application processor for reading and writing data from and to the bi-directional memory buffer, the application processor configured to:
   responsive to an indication to write data to the bi-directional memory buffer, read a defined size of input data from the bi-directional memory buffer;
   replace the input data read from the bi-directional memory buffer with output data of the defined size; and
   responsive to a mode-change signal, change the defined size of data that is read and written from and to the bi-directional memory buffer, wherein the mode-change signal indicates one of a plurality of modes for the application processor to operate in, a first mode reading and writing a first size of data at a first rate, and a second mode reading and writing a second size of data greater than the first size of data at a second rate less than the first rate,
   wherein:
   in the first mode of operation the application processor receiving intermittently signals from a discontinuous interface at a first rate to provide a segment of data of a first predetermined size over a first data path connection to be stored in the bi-directional memory buffer; and
   in the second mode of operation the application processor receiving intermittently signals from the discontinuous interface at a second data rate greater than the first data rate to read and replace a segment of data of a second predetermined size less than the first predetermined size over the first data path connection at a position in the bi-directional memory buffer;
   wherein a continuous interface reads and replaces a block of data stored in the memory buffer over the second data path connection.

8. The audio playback device of claim 7, wherein the application processor is further configured to receive the indication to write data from the bi-directional memory buffer.

9. The audio playback device of claim 7, wherein the application processor is further configured to generate the indication to write data to the bi-directional memory buffer at a frequency inversely proportional to the defined size of data that is read from and written to the bi-directional memory buffer.

10. The audio playback device of claim 7, wherein the application processor is further configured to process the read input data to identify one or more control commands.

11. The audio playback device of claim 7, wherein:
   the bi-directional memory buffer is of a predetermined size (b);
   the first predetermined size is given by b minus a watermark (W) of the bi-directional memory buffer;
   the second predetermined size is W;
   a second pointer indicates a current read position (C) of the bi-directional memory buffer;
   a first pointer indicates a replace position (S) of the bi-directional memory buffer;
   in the first mode, the application processor signals to the discontinuous interface when (S-C) mod b is less than W; and
   in the second mode, the application processor signals to the discontinuous interface when (C-S) mod b is greater than W,
   wherein b is an integer greater than 1, W, C, and S are integers greater than or equal to 0.

12. The audio playback device of claim 7, further comprising:
- an input/output connection for connecting an input device and an output device to the audio playback device; and
- an analog to digital converter and a digital to analog converter coupled between the input/output connection and the bi-directional memory buffer.

13. A method in an application processor for reading and writing data from and to a bi-directional memory buffer, the method comprising:
- responsive to an indication to write data to the bi-directional memory buffer, reading a defined size of input data from the bi-directional memory buffer;
- replacing the input data read from the bi-directional memory buffer with output data of the defined size; and
- responsive to a mode-change signal, changing the defined size of data that is read and written from and to the bi-directional memory buffer, wherein the mode-change signal indicates one of a plurality of modes for the application processor to operate in, a first mode reading and writing a first size of data at a first rate, and a second mode reading and writing a second size of data greater than the first size of data at a second rate less than the first rate, wherein:
- in the first mode of operation the application processor receiving intermittently signals from a discontinuous interface at a first rate to provide a segment of data of a first predetermined size over a first data path connection to be stored in the bi-directional memory buffer; and
- in the second mode of operation the application processor receiving intermittently signals from the discontinuous interface at a second data rate greater than the first data rate to read and replace a segment of data of a second predetermined size less than the first predetermined size over the first data path connection at a position in the bi-directional memory buffer;
- wherein a continuous interface reads and replaces a block of data stored in the memory buffer over the second data path connection.

14. The method of claim 13, further comprising receiving the indication to write data from the bi-directional memory buffer.

15. The method of claim 13, further comprising generating the indication to write data to the bi-directional memory buffer at a frequency inversely proportional to the defined size of data that is read from and written to the bi-directional memory buffer.

16. The method of claim 13, further comprising processing the read input data to identify one or more control commands.

17. The method of claim 13, wherein:
- the bi-directional memory buffer is of a predetermined size (b);
- the first predetermined size is given by b minus a watermark (W) of the bi-directional memory buffer;
- the second predetermined size is W;
- a second pointer indicates a current read position (C) of the bi-directional memory buffer;
- a first pointer indicates a replace position (S) of the bi-directional memory buffer;
- in the first mode, the application processor signals to the discontinuous interface when (S-C) mod b is less than W; and
- in the second mode, the application processor signals to the discontinuous interface when (C-S) mod b is greater than W,
- wherein b is an integer greater than 1, W, C, and S are integers greater than or equal to 0.

* * * * *